United States Patent [19]

Takasu et al.

[11] Patent Number: 4,675,731
[45] Date of Patent: Jun. 23, 1987

[54] DIAGNOSTIC APPARATUS

[75] Inventors: Katsuji Takasu, Yokohama; Kiyoshi Okazaki, Ootawara, both of Japan

[73] Assignee: Tokyo Shibaura Denki Kabushiki Kaisha, Kawasaki, Japan

[21] Appl. No.: 895,583

[22] Filed: Aug. 13, 1986

Related U.S. Application Data

[63] Continuation of Ser. No. 575,550, Jan. 31, 1984.

[30] Foreign Application Priority Data

Feb. 1, 1983 [JP] Japan ................................ 58-15875

[51] Int. Cl.$^4$ .......................... H05G 1/64; H04N 5/32
[52] U.S. Cl. ..................................... 358/111; 378/99; 358/110
[58] Field of Search ........................ 378/5, 62, 99, 100; 358/110, 111; 350/346; 128/654

[56] References Cited

U.S. PATENT DOCUMENTS

| | | | |
|---|---|---|---|
| 3,517,206 | 6/1970 | Oliver | 250/225 |
| 3,588,502 | 6/1971 | Greenfield | 378/204 |
| 4,124,278 | 11/1978 | Grinberg et al. | 350/347 |
| 4,204,225 | 5/1980 | Mistetta | 358/111 |
| 4,204,226 | 5/1980 | Mistretta et al. | 358/111 |
| 4,399,457 | 8/1983 | Riederer et al. | 378/99 |
| 4,423,521 | 12/1983 | Haendle et al. | 378/99 |

FOREIGN PATENT DOCUMENTS

| | | |
|---|---|---|
| 2216836 | 6/1977 | European Pat. Off. . |
| DE31066-27A1 | 9/1982 | European Pat. Off. . |
| 0066824 | 12/1982 | European Pat. Off. . |
| 0081227 | 6/1983 | European Pat. Off. ............ 378/62 |
| 2476949 | 8/1981 | France ................................ 378/99 |
| 0036955 | 9/1972 | Japan ................................... 378/99 |

OTHER PUBLICATIONS

Roth et al, Proceedings Seventh Annual Biomedical Sciences, Instrumentation Symposium on Imagery in Medicine, "Differential Radiography by Electro-Optical Means", Ann Arbor, Mich. USA, 19-22 May 1969.
Sprague et al., "The PROM—A Status Report", Optical Engineering, vol. 17, No. 3, May-Jun., 1978.
Bleha et al., "Application of the Liquid Crystal Light Valve to Real-Time Optical Data Processing", Optical Engineering, Jul./Aug., 1978, vol. 17, No. 4, pp. 371-338.

Primary Examiner—Craig E. Church
Assistant Examiner—John C. Freeman
Attorney, Agent, or Firm—Finnegan, Henderson, Farabow, Garrett & Dunner

[57] ABSTRACT

In an angiography, it is desirable to improve the resolution of the subtraction image. One approach to this requirement is attempted to subtract a series of the optical image by an optical subtraction method. A diagnostic apparatus includes at least first and second electrooptic devices, into which first and second optical images originated from a plurality of optical images are exposed so as to be stored therein, and thereafter from which those first and second optical images are optically read out, and an optical image subtraction device in which the above-mentioned first and second optical images are optically subtracted.

6 Claims, 3 Drawing Figures

F I G. 3
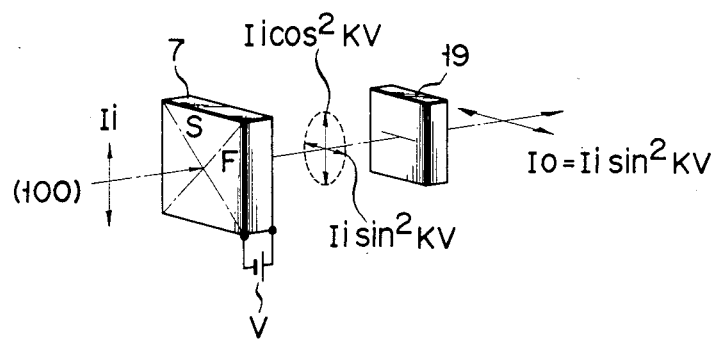

DIAGNOSTIC APPARATUS

This application is a continuation of application Ser. No. 575,550, filed Jan. 31, 1984.

BACKGROUND OF THE INVENTION

1. Field of Invention:

This invention relates to a diagnostic apparatus for optically performing subtractions of optical images which are taken by use of a radiation source, and more particularly to a diagnostic apparatus in which subtractions on a series of optical images of an object are optically carried out between them by utilizing electrooptic effect devices.

2. Description of Prior Art:

In general, an X-ray diagnostic apparatus is known from, e.g., U.S. Pat. No. 4,204,225 and 4,204,226 both issued on May 20, 1980, that a plurality of transmission images of an object, e.g., blood vessels of a patient are first taken by an X-ray projection and then subsequently converted into electric digital signals which are temporarily stored in respective memories. Thereafter digital subtraction is carried out by utilizing the stored digital image signals, whereby the subtracted images of the blood vessels are observed in a TV monitor for diagnostic purposes.

In the above-mentioned known X-ray diagnostic apparatus, the following recent developments have been introduced so as to improve the diagnostic technique. For example, as to at angiography examination, there is digital radiography, or digital fluoroscopy into which are applied the digital processing and time subtraction technique involving mask mode subtraction, time interval difference mode subtraction and so on.

As previously described, image subtraction processing in known X-ray diagnostic apparatus is usually carried out after converting the X-ray transmission images into digital signals and storing them in memories. Accordingly plenty of processing time and a huge capacity of the memories are required to process a series of time-continuous television image signals. In other words, according to those conventional apparatus, real time processing of the digital subtraction is very difficult in practice.

Moreover the subtraction on the optical images of the object, e.g., the mask images and the contrast images, is performed after first converting them into the proper digital signals by means of a television camera, so that the density resolving power of those optical images is lowered when observed in a television monitor. As a result, there is another problem that useful subtraction image information is not available for diagnostic purposes.

It is therefore an object of the present invention to provide a diagnostic apparatus into which such a novel technical idea is introduced that a subtraction is carried out by employing electrooptic effect devices between the optical images of the object.

SUMMARY OF THE INVENTION

The object of the present invention may be accomplished by providing a diagnostic apparatus comprising:

source of radiation which generates radiation upon application of a radiation control signal;

table means for positioning a patient in the path of radiation generated by that source;

image intensifier means, positioned to receive that radiation from the source which penetrates the patient, for converting the received radiation into a corresponding real time visual image;

first and second beam splitting half mirrors, the first half mirror aligned to receive the real-time visual image and to split that real-time visual image into first and second visual images with the first image directed along a first optical path and the second image directed along a second optical path, the second half mirror aligned along the second optical path to receive the second image and to reflect that second image along a third optical path;

first and second electrooptic devices positioned in the first and third optical paths, respectively, to receive the first and second images, respectively;

a third beam splitting mirror having a partial reflective surface; electrooptic means for directing an output of the first electrooptic device onto one side of the partially reflective surface of the third mirror and for directing an output of the second electrooptic device onto the other side of the partially reflecting surface of the third mirror in a manner which optically combines those outputs to produce a combined visual image;

means for converting the combined visual image into electrical signals;

means, responsive to these electrical signals, for displaying a visual representation of the combined visual image;

a light source selectively operable in response to a light control signal;

mirror means for simultaneously directing the output of the light source thrugh the first and second half mirrors along the first and third optical paths and onto the first and second electrooptic devices;

a first shutter, positioned along the second optical path between the first and second half mirrors, selectively closeable to intercept the second visual image directed toward the second half mirror in response to a first shutter control signal;

a second shutter, positioned between the mirror means and the second half mirror, selectively closeable to intercept the output of the light source directed to the second half mirror in response to a second shutter control signal;

means for injecting the patient with an X-ray contrast medium in response to an injection control signal; and control means for generating the radiation, light, first shutter, and second shutter control signals in a sequence to produce said visual representation of said patient.

Preferably, the control means:

issues the injection control signal to inject the X-ray contrast medium into the patient;

issues a first radiation control signal with the first shutter open and the light source off before the X-ray contrast medium reaches a target area of the patient which is the subject of the visual representation, to store the first and second visual images in the first and second electrooptic devices, respectively, these first and second visual images being identical;

issues first and second shutter control signals to close the first and second shutters;

issues a light control signal with the first and second shutters closed to erase the first visual signal in the first electrooptic device;

issues a second radiation control signal with the first shutter closed and the light source off after the X-ray medium reaches the target area to store a new first visual image in the first electrooptic device; and issues a light control signal with the second shutter open to read simultaneously the first and second visual images from the first and second electrooptic devices to produce the combined visual image referred to above.

In an alternative embodiment, the diagnostic apparatus of the subject invention further includes a defocus lens positionable between the second half mirror and the second electrooptic device. In this embodiment the control means first issues a radiation control signal with the first shutter open, the light source off, and the defocus lens in position, to store the first visual image in the first electrooptic device and to store the second visual image, defocused by the defocus lens, in the second electrooptic device. The control means then issues a light control signal, with the second shutter open, to read simultaneously the first and second visual images from the first and second electrooptic devices, respectively, to produce the combined visual image.

BRIEF DESCRIPTION OF THE DRAWINGS

For a better understanding of these and other objects of the present invention, reference is had to the following detailed description of the invention to be read in conjunction with the following drawings, in which:

FIG. 3 is an illustration for explaining the fundamental function of PROMS' employed in the diagnostic apparatus shown in FIG. 2.

DETAILED DESCRIPTION OF THE PREFERRED EMBODIMENTS

Before proceeding with the various types of the preferred embodiments, the following recognition is made in the present invention. The below-mentioned preferred embodiment covers an X-ray diagnostic apparatus in which optical subtraction processing of the angiography is performed by use of an X-ray source. However, the technical spirit and scope of the present invention are not restricted to the above-described X-invention ray angiography. That is, for instance, any radiation source such as radioisotopes can be employed. Secondly the X-ray photography can be also done for the lymph node administrated by the X-ray contrast medium, and the pulmo filled with Xenon gas.

Moreover, optical subtraction processing can be applied to the images of the object into which the X-ray contrast medium has been injected, but also no contrast medium is injected, e.g., the edge-enhanced images thereof.

Figure 1:
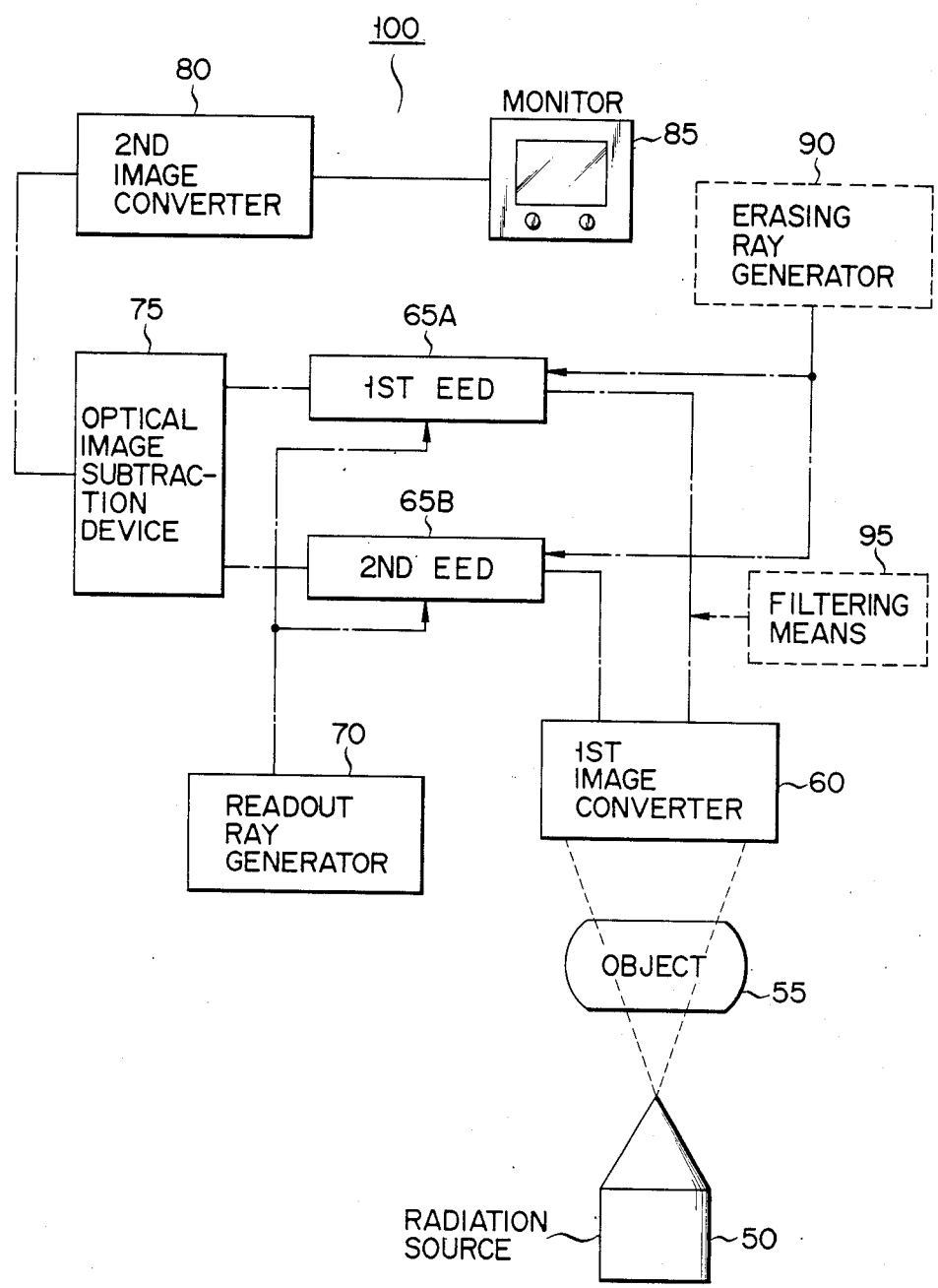
FIG. 1 is a clock diagram of a basic construction of a diagnostic apparatus according to the invention.

The principle of the present invention will now be explained with reference to a basic construction of a diagnostic apparatus 100 as shown in FIG. 1.

Referring to FIG. 1, a transmission image of an object 55 such as a patient through which radiation rays have been penetrated that was radiated from a radiation source 50, is projected to a first image converter 60. The transmission image incident upon the first image converter 60 is converted into an optical image. It is designed that a plurality of radiation rays are interruptedly projected from the radiation source 50 toward the object 55 over a period of time. According to one method, a series of optical images of the object 50 which are obtained from the first image converter 60, are selectively transported to either a first optical processing path involving a first electrooptic effect device 65A (referred to as "1st EED"), or a second optical processing path involving a second electrooptic effect device 65B (referred to as "2nd EED"). On another hand, according to the other method, one optical image of the object 50 obtained from the first image converter 60 is simultaneously transported to both first and second optical processing paths.

Upon receipt at the first and second electrooptic effect devices 65A and 65B respectively, of which function will be described in more detail, the incident optical image is converted into an electrical signal so as to be temporarily stored therein, and then read out as an optical image by readout rays which are generated from a read-out ray generator 70.

When two different optical images that were taken at different instants are temporarily stored in the first and second EEDs'65A and 65B respectively, and then these stored optical images are read out by simultaneously projecting two readout rays generator 70 toward those EEDs' respectively, then two different optical images are simultaneously projected to the optical image subtraction device 75. In this case, one of the two incident optical images is previously inverted into a negative or positive image thereof. Accordingly when those optical images, i.e., the non-inverted image and the inverted image are summed in an optical image subtraction device 75, the optical image subtraction is practically performed in this device 75. Then the subtracted image is transferred by a second image converter 80 so as to convert it into a corresponding electric image signal. The electric image signal is applied to a monitor 85, so that the subtracted image of the object 55 can be observed for diagnostic purposes.

According to the second method, one optical image is transferred from the first image converter 60 to the 1st EED through the filtering means 95, as well as the 2nd EED directly. Then the optical subtraction is carried out between one image of the object 55 and the filtered image of the same object. Further processing steps are same as in the first method.

It is possible to erase the 1st and 2nd EEDs' by utilizing the readout ray generator 70, or by an erasing ray generator 90.

The principle of the present invention has been summarized.

Figure 2:
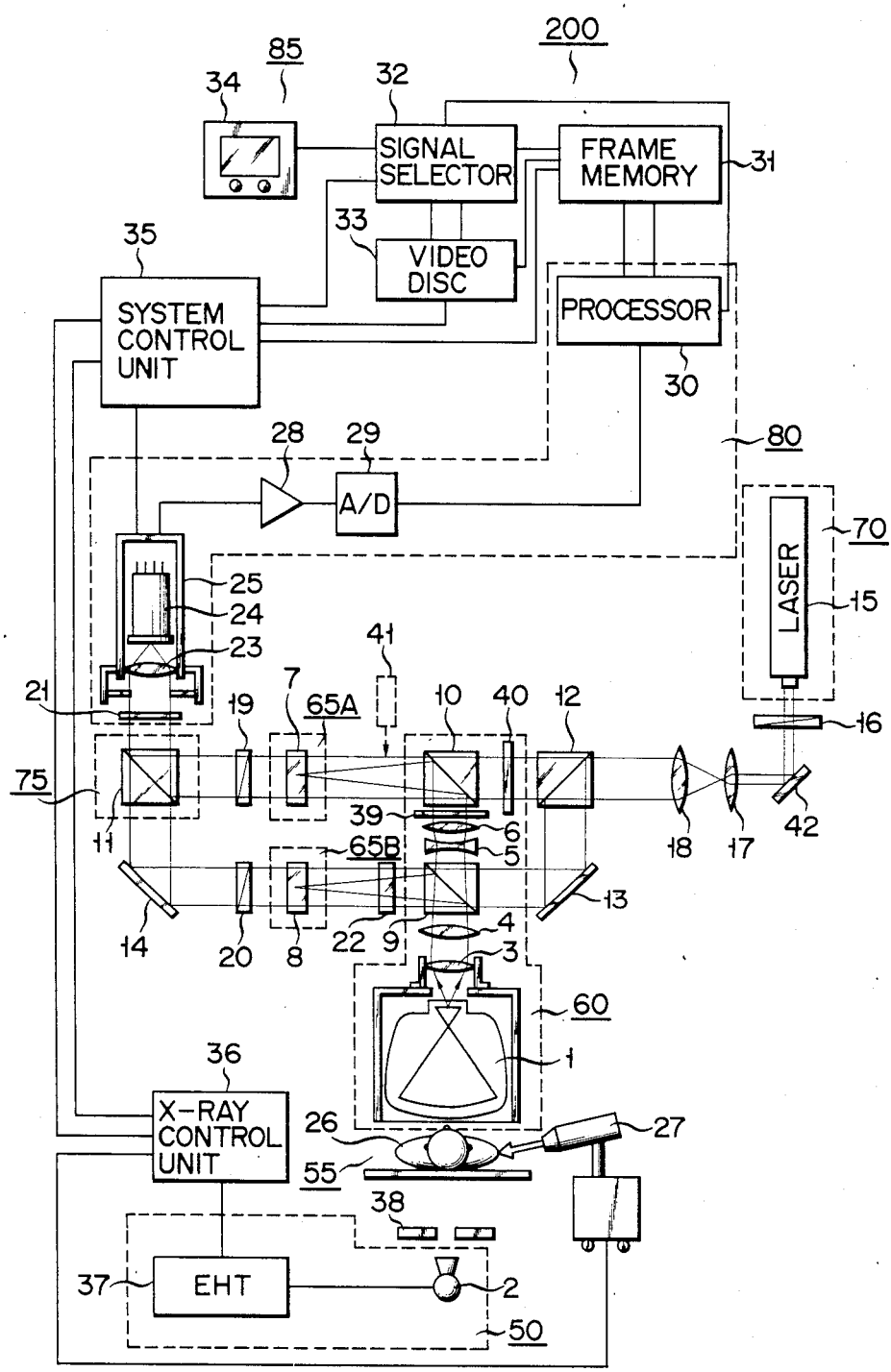
FIG. 2 is a block diagram of an X-ray diagnostic apparatus according to one preferred embodiment of the invention, in which optical subtraction processing of the angiography is performed by use of the X-ray source.

FIG. 2 shows a block diagram of an X-ray diagnostic apparatus 200 into which the principle of the present invention is employed.

Referring to FIG. 2, reference numeral 1 denotes an image intensifier upon which an X-ray transmission image of a patient 26 is incident that has been taken by a series of X-rays generated by an X-ray tube 2. The image intensifier 1 converts the transmission image into an optical image of the patient 26. Between the image intensifier 1 and the X-ray tube 2, the patient 26 is interposed at a given distance apart from them. The converted optical image of the patient 26 is converted into a parallel light beam and focused on to pockels readout optical modulators 7, 8 (referred to as Pockel's Readout Optical Modulators "PROMS") by optical lenses 3, 4, 5 and 6. Precisely speaking, the optical image produced from the image intensifier 1 is selectively transferred either to the first PROM 7 as the first electrooptic effect device 65A through a first optical path composed of the lenses 5, 6, and a first half mirror 10 as a first beam splitter, or to the second PROM 8 as the second electrooptic effect device 65B through a second optical path composed of the common lenses 3, 4, a second half mirror 9 as a second beam splitter, and a phase shifter 22, because a shutter 39 is interposed in the first optical path between the lens 6 and the half mirror 10. The above-described first image converter 60 in FIG. 1 is mainly constructed by the image intensifier 1, the first half mirror 10 and the second half mirror 9.

An optical component of the readout system will now be described. A laser device 15 is provided as the readout radiation source 70. A laser beam is radiated from the laser device 15, travelled through a polarizer 16, a reflector mirror 42, lenses 17 and 18, to a third half mirror 12 as a third beam splitter. In this third beam splitter 12, the readout laser beam is split into the above-mentioned first optical path and also the second optical path. That is, one readout laser beam is transferred via a second shutter 40 and the first half mirror 10 to the first PROM 7 so as to optically read out the first optical image of the patient 26 temporarily stored therein. The remaining laser beam is travelled via a reflector mirror 13, the second half mirror 9 and the phase shifter 22 to the second PROM 8 so as to read out the second optical image of the patient 26 temporarily stored therein. A phase of the read-out laser beam is shifted by the phase shifter 22 in the second optical path. The images of the patient 26 temporarily stored in the first and second PROMs' 7 and 8 are simultaneously read out by illuminating the above-described read-out laser beams to them respectively. The image read out from the first PROM 7 is transferred via a first analyzer 19 to a fourth half mirror 11 as the optical image subtraction device 75, and that from the second PROM 8 is travelled via a second analyzer 20 and a reflection mirror 14 to the fourth half mirror 11. As previously explained, since either the first read-out image or the second one has been inverted in its opposite image characteristic, the subtraction can be practically carried out when the former image is summed with the latter in the half mirror 11.

As a result, the optical subtracted image on the patient 26 is obtained from the fourth half mirror 11 and focused on a face plate of a television camera tube 24 through a neutral density (ND) filter 21 and a focusing lens 23. The television camera tube 24 is mounted in a camera housing 25.

An output of the television camera 24 corresponds to a video signal on the subtracted image of the patient 26. The video signal is amplified in an amplifier 28 to a given signal level, and then converted into a corresponding digital video signal. A digital processor 30 is provided to process the above-mentioned digital video signal, or another digital video signal which is stored in a frame memory 31, so that a digital signal on the subtraction image of the patient 26 is obtained necessary to diagnostic purposes. Output terminals of the frame memory 31 are connected to the digital processor 30, a video disc device 33 having a larger memory capacity than that of the frame memory 31, and a signal selector 32. This signal selector 32 operates to feed the digital signal processed in the digital processor 30 stored in either frame memory 31 or video disc 33, to the adequate device, e.g., a television monitor 34.

Further, an injector for X-ray contrast medium 27 is provided which is synchronized with operations of an X-ray control unit 36. This synchronization will be described later. The X-ray tube 2 is connected to an extra high tension device 37 which is controlled by the X-ray control unit 36. Extra high tension device 37 and the X-ray tube 2 constitute the radiation source 50. A diaphragm 38 is positioned in front of the X-ray tube 2.

The operation of the X-ray diagnostic apparatus 200 will now be explained with reference to FIGS. 2 and 3 under the control of system control unit 35. As previously described, subtraction processing on the X-ray transmission images of the object is optically performed by means of electrooptic effect devices based upon the angiography in this embodiment. Pockels Readout Optical Modulators (PROMs') are employed as the electrooptic effect devices.

Before proceeding with the operation of the embodiment, the principle of a PROM will now be described with reference to FIG. 3. In the drawing, only one PROM 7 and its associated optical element, analyzer 19 is shown for simplicity of illustration. A predetermined DC voltage "V" is vertically applied to the (100) direction of a cubic crystal made of bismuth silicon oxide ($Bi_{12}SiO_{20}$) of PROM 7. The fundamental function of PROM is to temporarily store the incident optical image therein and thereafter to read out it as the optical image. This storage function is achieved by having the incident optical image converted to an electric charge due to a photoconductive effect. This PROM is described in detail in, e.g., U.S. Pat. No. 3,517,206 issued on June 23, 1970, and "The PROM—A Status Report" of OPTICAL ENGINEERING, Vol. 17, No. 3 pages 256 to 266 issued in May–June 1978.

When the DC voltage "V" is applied to PROM 7, the cubic crystal of bismuth silicon oxide represents birefringence or double refraction, so that the polarization of the incident light beam is changed. At this stage, a distribution of the applied voltage is also changed by the electric charge stored in the PROM due to the incident optical image.

A linearly-polarized light beam "Ii" is generated from the laser device 15 and the polarizer 16 as the read-out laser beam. When the read-out laser beam "Ii" is projected on PROM 7, and elliptic-polarized light beam ($Ii \cos^2 KV$, $Ii \sin^2 KV$) is derived due to modulation of the incident optical image from PROM 7 as shown in FIG. 3. After deriving the specific polarization component ($Ii \sin^2 KV$) from the ellipticpolarized light beam ($Ii \cos2 KV$, $Ii \sin^2 KV$) by use of the analyzer 19, an optical image pattern is obtained which corresponds to the incident optical image. By varying the applied voltage V, an inversion of the incident optical image can be effected, e.g., the image can be made negative or the positive.

It is understood that one complete operation cycle of PROM is defined by a series of write-in, read-out, and erasing operations by means of the laser light beam.

The X-ray image subtraction on the angiography will now be explained.

At a time instant "To" after several seconds have passed since the X-ray contrast medium was administered into a patient 26 by the injector for X-ray contrast medium 27, a first transmission X-ray image thereof is obtained by the first X-ray projection before the X-ray contrast medium has yet reached the diseased portion to be examined. The first transmission X-ray image is converted by the image intensifier 1 into the optical image which is transferred to the first PROM 7 through the first optical processing path including the first half mirror 10, so that it is electro-optically stored in the first PROM 7 as a mask image of the diseased portion. As an initial condition, the first and second PROMs' 7, 8 have been erased by the erasing laser beam, and the first shutter 39 in the first optical processing path is being opened. It should be noted that at this time although this transmission image is also stored simultaneously in the second PROM 8, it will be erased prior to the succeeding X-ray projection, and the first shutter 39 is again to be closed after completing the storage of the first PROM 7.

When the proper quantity of the X-ray contrast medium has been administered into the given examination portion of the patient 26 (at a time instant "T1"), a second X-ray projection begins. A second X-ray transmission image is transferred to only the second PROM 8 via the second optical processing path so as to be temporarily stored therein as a contrast image of the diseased portion. Since the shutter 39 is being closed in the first optical processing path, the second X-ray transmission image is not transferred into the first PROM 7.

Thereafter the read-out laser beam is generated from the laser device 15. As already explained, the polarization of this read-out laser beam is changed to the linear polarization by the polarizer 16, expanded by the beam expander composed of the lenses 17 and 18, and then simultaneously projected on both PROMs' 7 and 8 respectively, the second shutter 40 being opened.

Since a predetermined DC voltage "V" is being applied to either first PROM 7 or second PROM 8, so that one of the read-out images from them is inverted into the negative or the positive, the optical subtraction can be performed between the mask image and the contrast image in the half mirror 11. The optically-subtracted image derived from the half mirror 11 is transferred via the ND filter 21 and the focusing lens 23 to the television camara tube 24 in which it is converted into the electric image (video) signal. The electric image signal is processed in the digital processor 30, or stored in the frame memory 31 or the video disc device 33, and further displayed on the television monitor 34 as the subtraction image of the examination portion of the patient 26. As this processing was already described, no further detailed explanation is given now. Further contrast image can be alternately stored in the first and second PROMs' 7 and 8, so that further optical subtraction is carried out between these contrast images.

According to the above-described embodiment, since the subtraction can be optically realized between two different images by use of the electrooptic effect devices, the contrast and resolution on the subtraction image of the patient can be considerably improved. For example, according to the conventional electrical subtraction the overall resolution of the resultant subtraction image is at most approximately 60 dB even if the high-resolution television camera is employed. In contrast with the conventional one, it becomes approximately 80 dB according to the invention.

A second embodiment will now be explained with reference to the same drawings. According to this embodiment, spatial filtering processing is realized in the optical subtraction by introducing a specific lens. This lens may defocus the optical image of the patient 26 before processing of the electrooptic effect device, whereby the image has the improper sharpness of outline. The defocus lens 41 (indicated by a dotted line) is interposed between the first half mirror 10 and the first PROM 7 in the first optical processing path in such a manner that it is positioned in line with the phase shifter 22 in the second optical processing path. The main construction of the second embodiment is the same as the first embodiment.

At first, the X-ray contrast medium is not yet administered into or does not yet reach the examination portion of the patient 26. Under this condition, an X-ray is emitted by energizing the X-ray tube 2 so as to obtain one transmission image. This X-ray transmission image is, as previously explained, converted into the corresponding optical image which is simultaneously projected and temporarily stored in both first and second PROMs' 7 and 8 respectively as a mask image. As a result, one mask image is temporarily stored in the first PROM 7 with having above-described defocus processing, and the other mask image is simultaneously temporarily stored in the second PROM 8 without any defocus processing, those mask images being originated from the same one X-ray transmission image.

After a given time period has passed, those mask images are optically read out by the read-out laser beam generated from the laser device 15. Then the read-out mask images are optically summed in the half mirror 11 constituting the optical image subtraction device 75, so that the optical subtraction is carried out between these mask images. As same as in the previous embodiment, the optical image of the patient 26 which is optically subtracted from one transmission image thereof is further processed in the given processing devices so as to be displayed on the television monitor 34.

According to the second embodiment on filtering processing, since the spatial frequency characteristic of the incident one optical image can be varied by the defocus lens 41, various kinds of processing on the qualities of the optical images, such as an enhancement, a noise reduction and an extraction of the characteristic portions from the image can be realized.

Furthermore, since in general one operation cycle time of PROM is about 30 m sec and is substantially equal to one TV frame period of the television monitor 34, it is advantageous that the subtraction on the optical image can be achieved in a real time. It should be noted that in principle, a minimum time of one operation cycle of PROM is about 0.5 m sec.

While the invention has been described in terms of certain preferred embodiments, and exemplified with respect thereto, those skilled in the art will readily appreciate that various modifications may be made without departing from the spirit of the invention.

For example, in the first embodiment, the optical subtraction was carried out according to the so-called mask mode. It is very obvious that the present invention is not limited to this method. That is, the so-termed "time interval difference mode" may be achieved in which a plurality of contrast images that have been taken at different time instants, are alternately stored in the first and second PROMs' 7 and 8, and the above-described optical subtraction is carried out between them.

In the first and second embodiments, both the read-out laser beam and the erasing laser beam were derived from the same laser device 15. It is alternatively possible to employ independently a laser device for generating the erasing laser beam as explained with regard to FIG. 1.

In the second embodiment the subtraction was effected between two mask images originated from one transmission image, but may be also performed between two contrast images taken from one X-ray transmission image. The defocus lens 41 may be alternatively introduced in the second optical path and the phase shifter 22 may be positioned in the first optical path.

There are other possibilities to employ as the electrooptic effect device, a liquid crystal light valve which is disclosed, e.g., in the article "Application of the Liquid Crystal Light Valve to Real-Time Optical Data Processing" of OPTICAL ENGINEERING, July–August 1978, Vol. 17, No. 4 pages 371 to 389.

Furthermore as in general, the storage maintaining time of PROM is rather long, compared with its one operation cycle time, more than two PROMs' may be provided in such a manner that those PROMs' are provided in parallel to each other in respective optical path. In operation, after a plurality of, e.g., contrast images are sequentially stored in those PROMs', a plurality of optical subtractions are carried out in turn, and also independently filtering processing may be performed. That is, to perform the time interval difference mode, it is very useful to employ a plurality of PROMs' in which a series of the contrast images is temporarily stored in turn, and from which predetermined two contrast images are sequentially read out one by one so as to be subtracted in the optical image subtraction device 75.

What is claimed is:

1. A diagnostic apparatus comprising:
   (a) a source of radiation which generates radiation upon application of a radiation control signal;
   (b) table means for positioning a patient in the path of radiation generated from said source;
   (c) image intensifier means, positioned to receive that radiation from said source which penetrates said patient, for converting said receiving radiation into a corresponding real-time visual image;
   (d) first and second beam splitting half mirrors, said first half mirror aligned to receive said real-time visual image and to split said real-time visual image into first and second visual images with said first image directed along a first optical path and said second image directed along a second optical path, said second second half mirror aligned along said second optical path to receive said second image and to reflect said second image along a third optical path;
   (e) first and second electrooptic devices positioned in said first and third optical paths, respectively, to receive said first and second images, respectively;
   (f) a thrid beam splitting mirror having a partially reflective surface;
   (g) means for directing an output of said first electrooptic device onto one side of said partially reflective surface and for directing an output of said second electrooptic device onto the other side of said partially reflective surface in a manner which optically combines said outputs to produce a combined visual image;
   (h) means for converting said combined visual image into electrical signals;
   (i) means, responsive to said electrical signals, for displaying a visual representation of said combined visual image;
   (j) a light source selectively operable in response to a light control signal;
   (k) mirror means for simultaneously directing the output of said light source through said first and second half mirrors along said first and third optical paths and onto said first and second electrooptic devices;
   (1) a first shutter, positioned along said second optical path between said first and second half mirrors, selectively closable to intercept closable to intercept said second visual image directed towards said second half mirror in response to a first shutter control signal;
   (m) a second shutter, positioned between said mirror means and said second half mirror, selectively closable to intercept the output of said light source directed to said second half mirror in response to a second shutter control signal;
   (n) means for injecting said patient with an X-ray contrast medium in response to an injection control signal; and
   (o) control means for generating said radiation, light, first shutter, and second shutter control signals in a sequence to produce said visual representation of said patient.

2. A diagnostic apparatus of claim 1 wherein said light source is a laser.

3. A diagnostic apparatus of claim 1 wherein said control means:
   (a) issues said injection control signal to inject said X-ray contrast medium into said patient;
   (b) issues a first radiation control signal with said first shutter open and said light source off before said X-ray contrast medium reaches a target area of said patient which is the subject of said visual representation to store said first and second visual images in said first and second electrooptic devices;
   (c) issues a first and second shutter control signal to close said first and second shutter;
   (d) issues a light control signal with said first and second shutters closed to erase said first visual signal from said first electrooptic device;
   (e) issues a second radiation control signal with said first shutter closed and said light source off after said X-ray contrast medium reaches said target area to store a new first visual image in said first electrooptic device; and
   (f) issues a light control signal with said second shutter open to read simultaneously said first and second visual images from said first and second electrooptic devices to produce said combined visual image.

4. A diagnostic apparatus of claim 1 further including a defocused lens positionable between said sedond half mirror and said second electrooptic device.

5. A diagnostic apparatus of claim 4 wherein said control means first issues a radiation control signal with said first shutter open, said light source off and said defocus lens in position, to store said first visual image in said first electrooptic device and to store said second visual image, defocused by said defocus lens, in said second electrooptic device, and subsequently issues a light control signal with said second shutter open to read simultaneously said first and second visual image signals from said first and second electrooptic device to produce said combined visual image.

6. An X-ray diagnostic apparatus comprising:
   (a) a source of radiation for generating radiation toward a patient upon application of a radiation control signal;
   (b) first image converter means, positioned to receive that radiation from said source penetrating said patient, for converting said received radiation into a corresponding real-time visual image;

(c) means for administering said patient with an X-ray contrast medium in response to an injection control signal;

(d) optical image transmitting means, including first and second optical paths, for transmitting said real-time visual image through one of said first and second optical paths, said optical image transmitting means initially transmitting the real-time visual image to said first optical path and subsequentially to said second optical path when said contrast medium reaches a portion of said patient to be examined;

(e) first and second electrooptic effect devices positioned in said first and second optical paths, respectively, to receive said real-time visual images, respectively;

(f) a beam splitting half mirror having a partially reflective surface;

(g) means for directing an output of said first electrooptic effect device onto one side of said partially reflecting surface and for directing an output of said second electrooptic effect device onto the other side of said partially reflective surface in a manner which optically combines said outputs to produce a combined visual image;

(h) second image converter means for converting said combined visual image into electrical signals;

(i) means, responsive to said electrical signals, for displaying a visual representation of said combined visual image;

(j) light source means selectively operable for illuminating said first and second electrooptic effect devices in response to a light control signal; and (k) control means for generating said radiation and light control signals in a sequence to produce said visual representation of said patient.

* * * * *